(12) United States Patent
Gusis et al.

(10) Patent No.: US 8,605,993 B2
(45) Date of Patent: Dec. 10, 2013

(54) METHODS AND SYSTEMS OF MERGING DEPTH DATA FROM A PLURALITY OF DISPARITY MAPS

(75) Inventors: Vadim Gusis, Ashdod (IL); Yosi Wolf, Tel-Aviv (IL); Elad Levy, Tel-Aviv (IL); Ruthy Katz, Tel-Aviv (IL)

(73) Assignee: Robo-Team Ltd., Tel-Aviv (IL)

( * ) Notice: Subject to any disclaimer, the term of this patent is extended or adjusted under 35 U.S.C. 154(b) by 85 days.

(21) Appl. No.: 13/300,705

(22) Filed: Nov. 21, 2011

(65) Prior Publication Data

US 2013/0129194 A1 May 23, 2013

(51) Int. Cl.
*G06K 9/00* (2006.01)
(52) U.S. Cl.
USPC .......................................................... 382/154
(58) Field of Classification Search
USPC ..................... 382/154, 254, 284; 348/42, 48
See application file for complete search history.

(56) References Cited

U.S. PATENT DOCUMENTS

| | | | | |
|---|---|---|---|---|
| 7,567,703 B2* | 7/2009 | Jones et al. | | 382/154 |
| 7,711,201 B2* | 5/2010 | Wong et al. | | 382/254 |
| 8,164,617 B2* | 4/2012 | Mauchly | | 348/14.08 |
| 8,411,934 B2* | 4/2013 | Zhang et al. | | 382/154 |
| 2011/0298898 A1* | 12/2011 | Jung et al. | | 348/47 |
| 2012/0039525 A1* | 2/2012 | Tian et al. | | 382/154 |

* cited by examiner

*Primary Examiner* — Daniel Mariam (57) ABSTRACT

A method of merging a plurality of disparity maps. The method comprises calculating a plurality of disparity maps each from images captured by another of a plurality of pairs of image sensors having stereoscopic fields of view (SFOVs) with at least one overlapping portion, the SFOVs covering a scene with a plurality of objects, identifying at least one of the plurality of objects in the at least one overlapping portion, the at least one object being mapped in each the disparity map, calculating accuracy of disparity values depicting the object in each the disparity map, merging depth data from the plurality of disparity maps according to the accuracy so as to provide a combined depth map wherein disparity values of the object are calculated according to one of the plurality of disparity maps, and outputting the depth data.

18 Claims, 4 Drawing Sheets

METHODS AND SYSTEMS OF MERGING DEPTH DATA FROM A PLURALITY OF DISPARITY MAPS

FIELD AND BACKGROUND OF THE INVENTION

The present invention, in some embodiments thereof, relates to real time mapping of objects in a spatial scene and, more particularly, but not exclusively, to methods and system of merging depth data from a plurality of disparity maps. In the field of image processing as well as image recognition, generally adopted as a method to extract data of an object in the depth direction is a method in which a stereoscopic amount between stereoscopic images is detected utilizing a plurality of stereoscopic images obtained when the object is viewed from different points, so that the depth level up to the object is calculated from the stereoscopic amount. Stereovision systems, which use two cameras to increase field of view, thereby, overlapping and improving range resolution, attempt to utilize the known principles associated with human vision. In order to differentiate between objects at various depths, a disparity map must first be determined, which means that, for pixel location in the left image, the corresponding pixel location in the right image is determined.

SUMMARY OF THE INVENTION

According to some embodiments of the present invention, there is provided a method of merging a plurality of disparity maps. The method comprises calculating a plurality of disparity maps each from images captured by another of a plurality of pairs of image sensors having stereoscopic fields of view (SFOVs) with at least one overlapping portion, the SFOVs covering a scene with a plurality of objects, identifying at least one of the plurality of objects in the at least one overlapping portion, the at least one object being mapped in each the disparity map, calculating accuracy of disparity values depicting the object in each the disparity map, merging depth data from the plurality of disparity maps according to the accuracy so as to provide a combined depth map wherein disparity values of the object are calculated according to one of the plurality of disparity maps, and outputting the depth data.

Optionally, the method comprises using a static imaging arrangement wherein the plurality of pairs of image sensors are mounted such that a fixed distance between image sensors of one pair is different from a fixed distance between image sensors of another pair.

Optionally, the method comprises capturing a plurality of images from the plurality of stereoscopic pairs for calculating the plurality of disparity maps wherein the method is iteratively repeated for a plurality of different images from the plurality of stereoscopic pairs so as to update the depth data in real time.

Optionally, the merging comprises calculating a confidence map for each the disparity map and performing the merging according to a match between respective data from the confidence map.

Optionally, the method comprises generating instructions for navigating a mechanically automated vehicle according to the combined depth map.

Optionally, the identifying comprises segmenting the plurality of objects in each the disparity map according to a two dimensional (2D) analysis thereof.

Optionally, the identifying comprises converting each the disparity map to a three dimensional (3D) representation and segmenting the plurality of objects therein according to a 3D analysis thereof.

Optionally, the calculating comprises estimating the accuracy according to an estimated size of the object.

Optionally, the calculating comprises estimating the accuracy according to location in the disparity map.

Optionally, the calculating comprises estimating the accuracy according to a proximity of the object to a border of in a segmented image.

Optionally, the calculating comprises processing segments in each the disparity map wherein at least some of the plurality of objects are identified and avoiding processing other segments in each the disparity map wherein none of the plurality of objects being identified.

Optionally, the method comprises combining the combined depth map with a two dimensional (2D) image of the scene.

According to some embodiments of the present invention, there is provided an imaging device of generating a depth data of a scene with a plurality of objects. The imaging device comprises a static imaging arrangement having a plurality of pairs of image sensors are mounted to have stereoscopic fields of view (SFOVs) with at least one overlapping portion, a processing unit which calculates a plurality of disparity maps each from images of another of the plurality of stereoscopic pairs, identifies at least one object in the at least one overlapping portion, and merges depth data from the plurality of disparity maps according to accuracy of disparity values depicting the object in each the disparity map so as to provide a combined depth map wherein disparity values of the object are calculated according to one of the plurality of disparity maps, and an output module which outputs the depth data.

Optionally, the plurality of pairs of image sensors are mounted such that a fixed distance between image sensors of one pair is different from a fixed distance between image sensors of another pair.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

The present invention, in some embodiments thereof, relates to real time mapping of objects in a spatial scene and, more particularly, but not exclusively, to methods and system of merging depth data from a plurality of disparity maps.

According to some embodiments of the present invention, there are provided methods and systems for calculating a single representation of depth data, referred to herein as a combined depth map mapping multiple objects in a scene by merging disparity maps which are generated based on images captured by pairs of image sensors having SFOVs with one or more overlapping portion(s). In these methods and systems, the processing of disparity maps is performed according to the segmentation and/or identification of the objects they map. For example, final disparity values for an object in the single representation of depth data are determined by combining of segmentation data from a number of disparity maps. For instance, data may be extracted from a disparity map selected according to the relative size of a respective segment and/or a stability of a segment size and/or shape over time. Therefore, the segmented images are used as weighting functions to decide which of the disparity maps should be used as a source for the respective disparity values.

For example, a method of merging a plurality of disparity maps is based on calculating a plurality of disparity maps, each from images captured by another of the pairs of image sensors. In this method, one or more objects are identified, for example by segmentation, in the overlapping portion of the SFOV. These objects are mapped in each one of the disparity maps. Now, the accuracy of disparity values depicting the object is calculated in each disparity map, for example according to segment information. This allows merging depth data from disparity maps according to the accuracy so as to provide a combined depth map wherein disparity values of the object(s) are calculated according to one of the disparity maps and outputting the depth data, for example for presentation and/or navigation of a mechanically automated vehicle.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
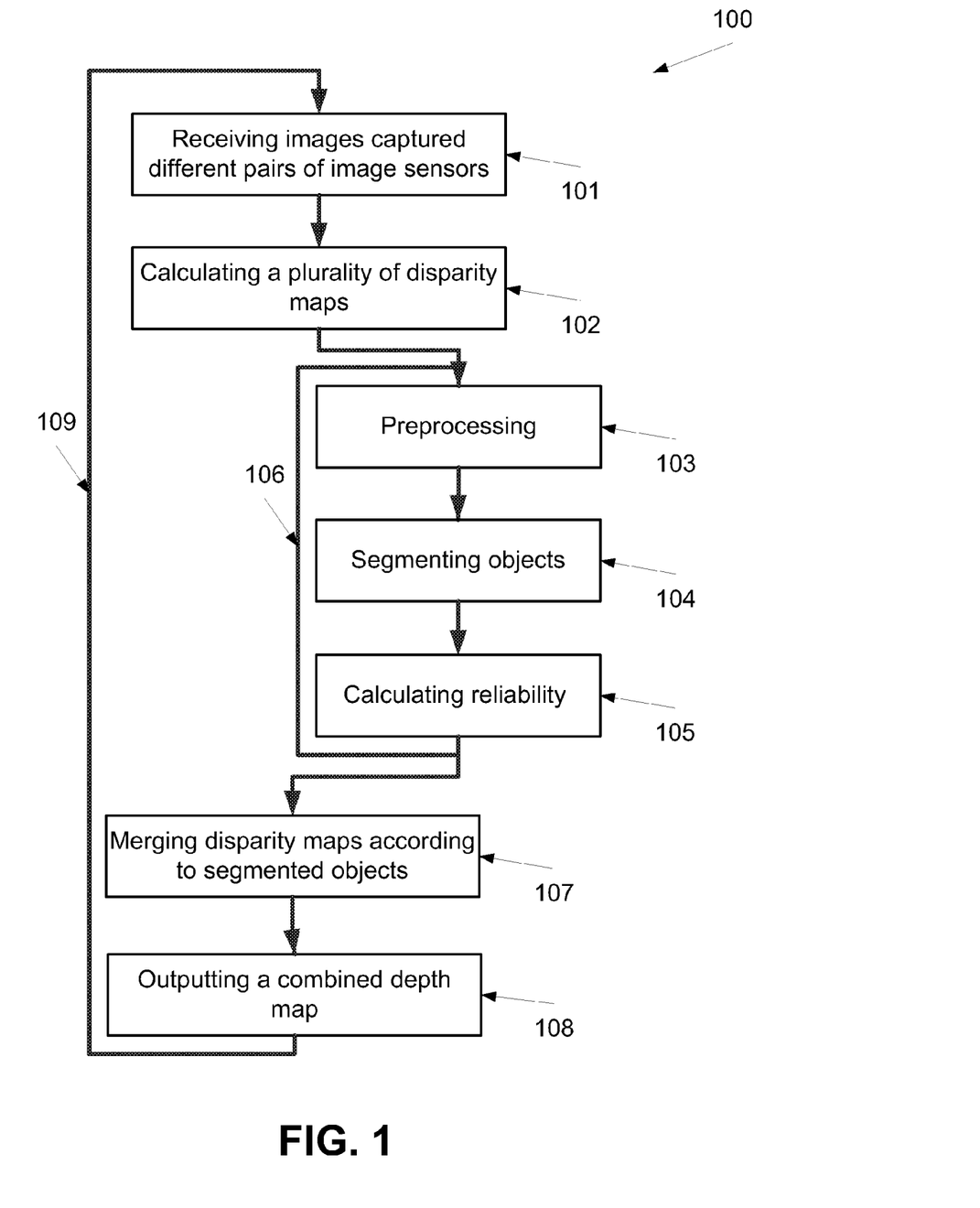
FIG. 1 is a method of creating a single representation mapping distance to objects in a scene by merging a plurality of disparity maps generated from stereoscopic images depicting at least partly overlapping stereoscopic fields of view (SFOVs), according to some embodiments of the present invention.

Reference is now made to FIG. 1, which is a method 100 of creating a combined depth map which maps distances to objects, such as navigation obstacles, in a scene by merging a plurality of disparity maps which are generated by pairs of image sensors having at least partly overlapping SFOVs, according to some embodiments of the present invention. In the method, object(s) depicted in a number of disparity maps, are assigned with depth values from one of the disparity maps that is selected according to the accuracy of depth values which depict the object(s). In such a manner, depth values of a certain object are coherent and depth data discrepancy is avoided as the depth values of pixels and/or voxels of a certain object in a product of a merge of a number of disparity maps are taken from a common disparity map. The method allows merging data from different disparity maps without compromising the robustness of data originated from overlapping edges of the overlapping SFOVs. In such a manner, depth evaluation distortions may be reduced or avoided. It should be noted that the identification of objects allows reducing computational complexity which is involved in creating the combined depth map. Areas wherein objects are identified may be marked as regions of interest for processing with a first resolution and areas wherein objects are not identified may be marked as regions of no interest for processing with a second resolution or for no processing at all.

Figure 2A:
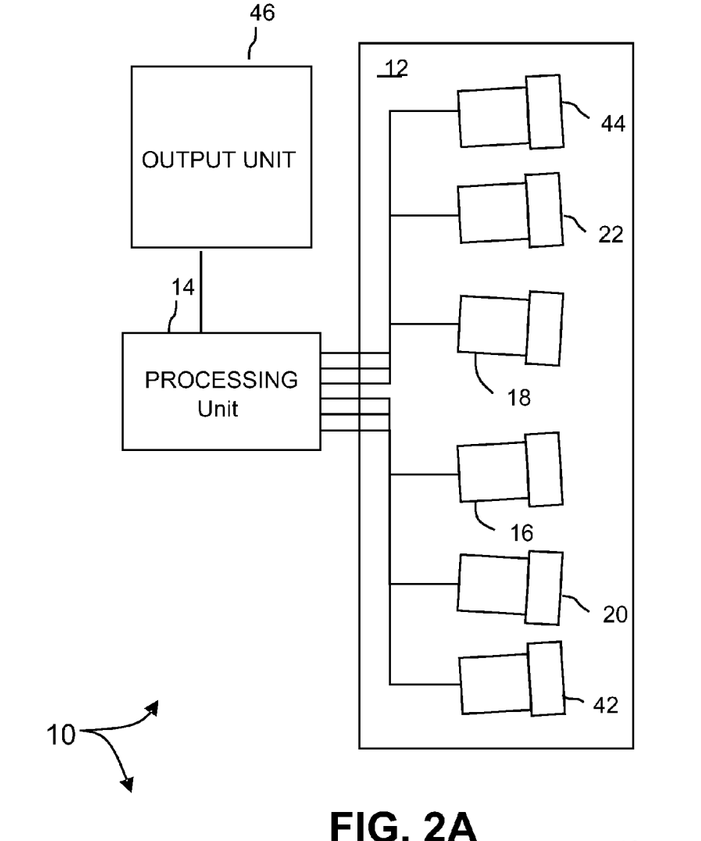
FIGS. 2A and 2B are top and front schematic illustrations of an imaging device having an exemplary static imaging arrangement, according to some embodiment of the present invention.
Figure 2B:
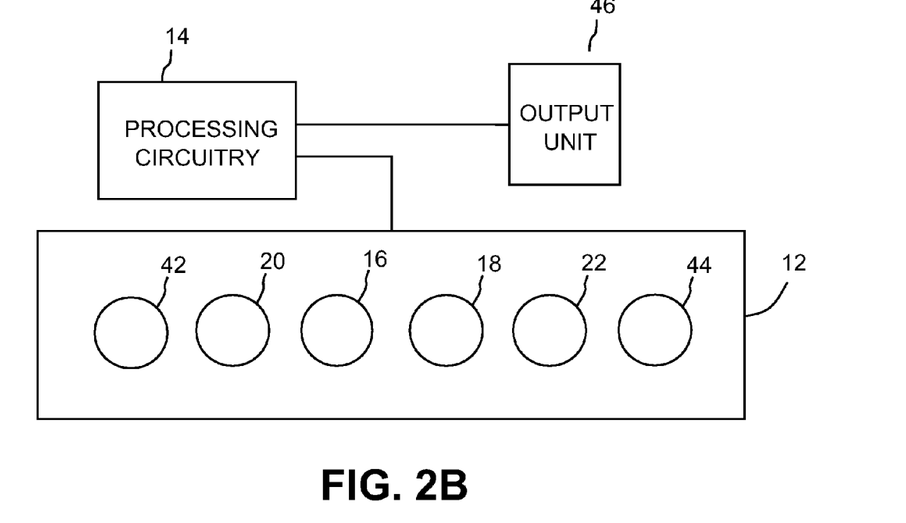
Figure 2C:
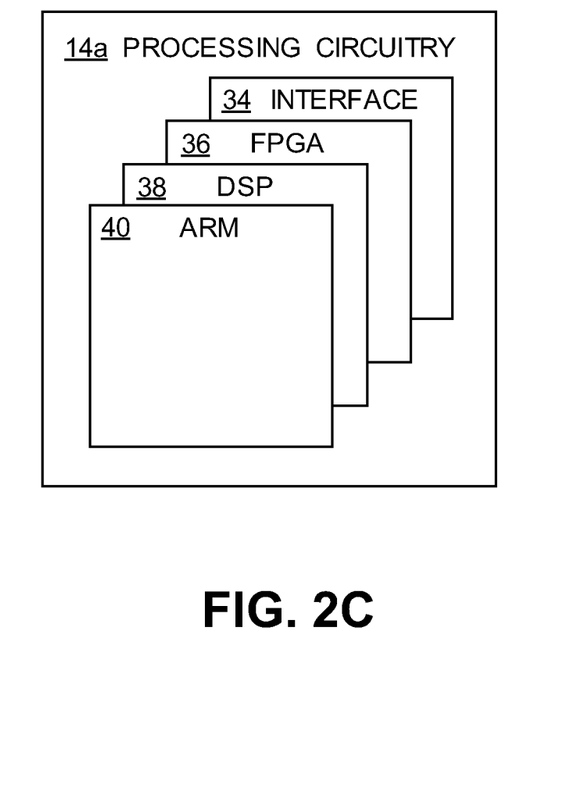
FIG. 2C is an exemplary processing unit of the imaging device, according to some embodiment of the present invention.

Reference is also made to FIGS. 2A and 2B, which are top and front schematic illustrations of an imaging device 10 having an exemplary static imaging arrangement 12 wherein a plurality of pairs of image sensors (16 and 18, 20 and 22, and 42 and 44) are mounted such that a fixed distance between image sensors of one pair, for example 16 and 18, is different from a fixed distance between image sensors of another pair, for example 20 and 22, according to some embodiment of the present invention. It should be noted that though only three pairs of image sensors are depicted, any number of pairs of image sensors may be used to capture a plurality of at least partly overlapping SFOVs that cover a multiple objects scene. Optionally, all image sensors are maintained at fixed orientations relative to each other. The image sensors are optionally charge coupled device (CCD) based image sensors and/or complementary metal oxide semiconductor (CMOS) based image sensors. The imaging device 10 further includes a processing unit 14 for calculating and merging disparity maps, for example as described below. Optionally, as depicted in FIG. 2C, the processing unit 14 includes an interface 34 through which it receives image data from the pairs of image sensors and a field programmable gate array (FPGA) 36 which reads the image data from the pairs of image sensors. In such an embodiment, the FPGA 36 forwards the image data to a shared memory of a digital signal processor (DSP) 38 and an embedded microprocessor, such as a reduced instruction set computer (RISC) 40. The DSP 38 processes the image data from the FPGA 36 and the RISC 40 performs post processing steps. The RISC 40 optionally outputs data for display on display units.

Figure 3:
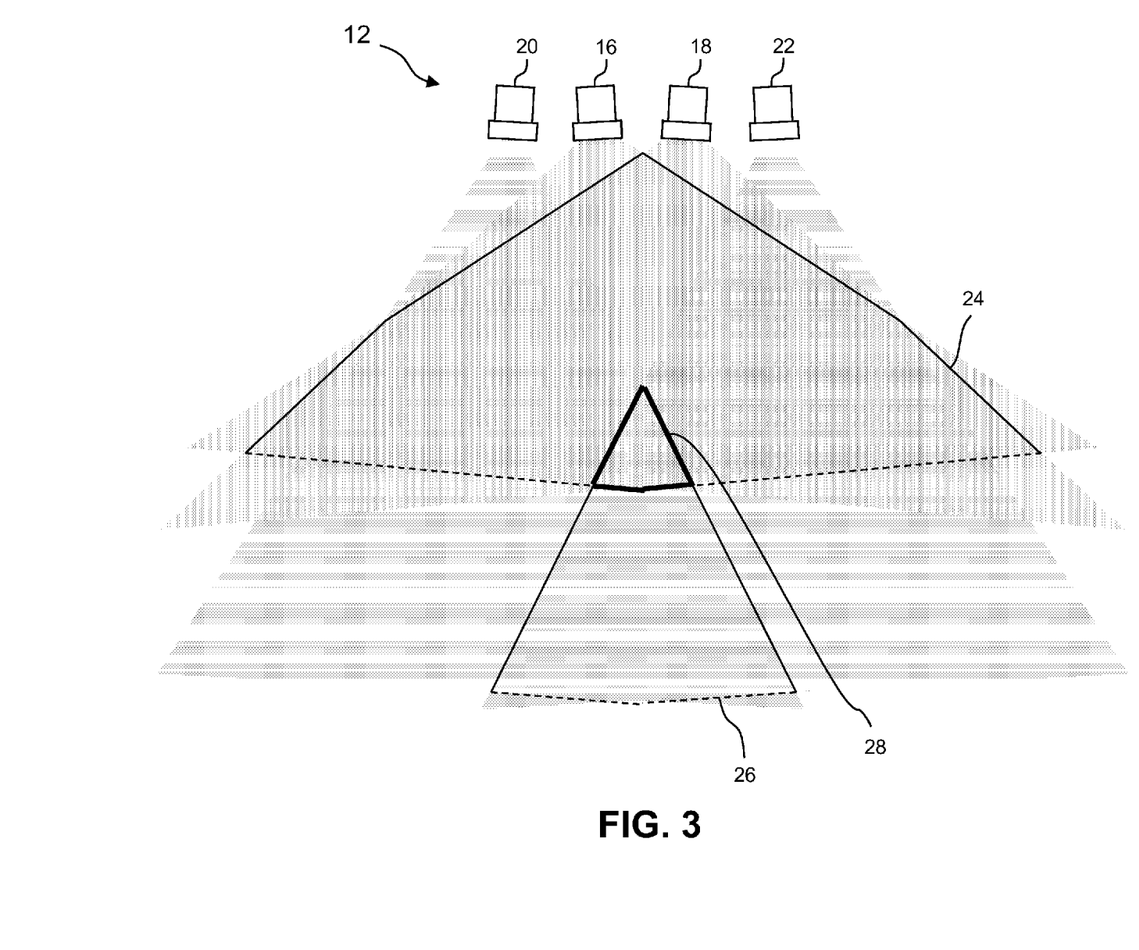
FIG. 3 is a schematic illustration which depicts SFOVs which are respectively captured by different pairs of image sensors and having an overlapping portion.

As described above, the plurality of pairs of image sensors of the static imaging arrangement 12 are directed to capture images with a number of at least partly overlapping SFOVs. An SFOV of a pair of image sensors may be understood as the space imaged by both image sensors. For example, FIG. 3 depicts SFOVs 24 and 26, which are respectively captured by the pair of image sensors 16 and 18 and the pair of image sensors 20 and 22 and having an overlapping portion 28 that is part of both SFOVs 24 and 26. Each SFOV has a limited operating depth. For example, in FIG. 3, the dashed lines indicate the beginnings of regions where the image sensors abilities to capture depth data decreases below a certain threshold. It should be noted that the SFOV of each pair of image sensors may be set by adjusting the optical properties of the image sensors, for example of lens(es) of one or both of the image sensors, the relative orientations of the optical axes of the image sensor(s), and/or the like.

Optionally, while one pair 16, 18 is used for covering a relatively-close SFOV, the other pair 20, 22 is used for covering a relatively-far SFOV. Accordingly, the distance between image sensors 16, 18 is smaller than the distance between image sensors 20, 22. The cameras 16, 18, 20, 22 are optionally set at fixed orientations relative to each other.

In use, the method 100 may be used for outputting an updated combined depth map that maps the distances to a plurality of objects which are imaged in a plurality of pairs of image sensors, for example of the static imaging arrangement 12. In such a manner, the method 100, and optionally the imaging device 10 may be used for navigating, optionally automatically, a mechanically automated vehicle in a space with a plurality of dynamic and/or static obstacles. For example, the mechanically automated vehicle is a robotic lawnmower, a robotic scout, a robotic bomb remover, a robotic carrier, an unmanned vehicle, aerial, terrestrial, aquatic and/or underground, and/or any automatically maneuvered vehicle.

First, as shown at 101, images are captured by each pair of image sensors. This allows, as shown at 102, calculating a plurality of disparity maps each from images captured by another of a plurality of pairs of image sensors, for example one of the pairs of image sensors of the static imaging arrangement 12. The calculation is optionally performed by the processing unit 14. Each disparity map is optionally calculated based on pixel information extracted from the images captured by a respective pair, for example see Luis Alvarez, Rachid Deriche, Javier Sanchez, Joachim Weickert, Dense Disparity Map Estimation Respecting Image Discontinuities: A Pde and Scale-Space Based Approach, technical report RR-3874, INRIA, January 2000 and Olivier Faugeras et. al., Real time correlation-based stereo: algorithm, implementations and applications, technical report RR-2013, INRIA, 1993, which are incorporated herein by reference. See also Ramya Narasimha et. al., Cooperative Disparity and Object Boundary Estimation, INRIA Rhone-Alpes 2, Universite Joseph Fourier 655, avenue de l'Europe 38330 Montbonnot, France, which is incorporated herein by reference.

Optionally, during the disparity map calculation, potential object boundaries are mapped, for example based on double-peak detection. In such an embodiment the disparity value is calculated according to a sum of differences (SAD) calculation over a fixed size window. The window from one image is slide over the second image. In each location, a mismatch score is received. Around the location of the lowest score, the best match is refined using a parabolic estimation and taking the minima value. In the presence of object boundaries, due to parallax effect, instead of getting single minima with large difference to the nearest minima, a multiple minima (at least two) small difference between them is received. In such an embodiment, edges of an object are identified when a bimodal output is received.

Optionally, in order to reduce computational complexity areas without objects are not processed for calculating the disparity map, for example areas wherein no potential object boundaries have been detected.

Optionally, as shown at 103, each one of the disparity maps is preprocessed, for example smoothed. Optionally, outliers are filtered from the disparity map. Optionally, gaps are filled in the disparity map, for example by filling in most probable values by interpolation of neighboring pixels. Optionally, pixel values are smoothen.

The disparity maps may now be combined on a common coordinates system and/or any other domain.

As shown at 104, a group of objects are segmented or otherwise identified in each disparity map. First, objects are optionally segmented according to a two dimensional segmentation of the disparity map. To perform this segmentation, known algorithms, such as edge based segmentation, region growing method, and/or histogram based methods, may be used.

Then, the disparity map is converted to a three dimensional (3D) depth map, for example as known in the art. This allows segmenting the depicted objects according to a 3D segmentation process, for example as described in Marten Bjorkman and Danica Kragic, Active 3D scene segmentation and detection of unknown objects, centre for Autonomous Systems and Computational Vision and active Perception Lab, CSC-KTH, which is incorporated herein by reference. Now, the outcome of the 3D segmentation may be combined, for example projected, on the outcome of 2D segmentation. Additionally or alternatively, the potential object boundaries, which are acquired during the disparity map calculation, are combined, and for example projected, on the outcome of 2D/3D segmentation.

Optionally, as shown at 105, some or all of the pixels in the disparity map are scored to reflect a reliability of their disparity value, for example with a depth data accuracy score. Optionally, the scoring is to segmented pixels. The scoring is optionally performed according to the segmentation of the disparity map. Optionally, a confidence map that reflects the estimated relation of each disparity value to a certain object in the disparity map is generated, for example according to a match and/or a combination of the aforementioned segmentation(s).

As shown at 106, blocks 101-105 are performed on each disparity map based on images captured by different pairs of image sensors. The blocks 101-106 may be implemented sequentially per disparity map or simultaneously to all disparity maps.

Now, as shown at 107, depth data from the plurality of disparity maps is merged to provide a single representation that maps a distance to each one of the objects so that the depth data of each object is provided from one of the disparity maps. As described above, the SFOV of the different pairs overlap. This creates overlapping areas wherein different disparity maps map disparity values of the said object. For example, when two disparity maps object in an overlapping area, the disparity map which has a higher respective confidence value is selected as an origin of disparity values for the object in the overlapping area. Additionally or alternatively, the disparity map which depicts a larger portion of the object in the overlapping area is selected as an origin of disparity values. For example, if there is an object that part of it is visible in a near SFOV and another part is visible in both near and far SFOV, the disparity values from the near field may be used in the present embodiment to get a smooth disparity output. Additionally or alternatively, the disparity map which have more stable disparity values of the object during a sample period, for example a number of depth map calculation iterations, is selected as an origin of disparity values.

For example, for each pixel p(x,y) of each segment s in the segmented disparity map, which generated from images from each pair of image sensors, the following is performed:
    if p(x,y) is in found in disparity map (0) and not in any other
        disparity map, for example disparity map (1)
        JoinDisp (x,y)=D(x,y,0)
    Else
        the following weights are calculated for the disparity
            value D(x,y):

$$w_i = e^{-\Sigma \gamma_j}$$

$$\gamma_1 = \frac{1}{\text{Segment\_size}}$$

$$\gamma_2 = \frac{\text{dist\_to\_closest\_border}}{\text{median(dist\_to\_center)}}$$

$$\gamma_3 = 1 - \text{confidence\_level}$$

$$\gamma_4 = \frac{|D(x, y, n-1) - D(x, y, n)|}{D(x, y, n-1) + D(x, y, n)}$$

given threshold level th* the following is calculated:

$$th = th * \frac{w_0}{w_1}$$

$$D(x, y, 0) > th$$

$$JoinDisp(x, y) = \text{else}$$

$$D(x, y, 1)$$

where $w_i$ denotes a weight given to disparity map i, Segment_size denotes the size of a respective segment, for example the area of the segmented object in the disparity map, JoinDisp(x,y) denotes merged disparity map taking into account the weighted threshold at pixel location (x,y), dist_to_closest_border denotes the distance to the most proximate border of the segment s, median(dist_to_center) denotes the median of distances to the center of the segment s, confidence_level denotes the respective value in the respective confidence map.

It should be noted that as regions of interest may be marked as areas which encircle segmented objects, the computational complexity of the merging process which require combining data from different disparity maps may be reduced. For example, disparity values of segmented objects may be extracted from the disparity maps and added to the generated combined depth map, for example to a common coordinate system to avoid processing all the data in the disparity maps.

Optionally, in order to reduce the computational complexity of the process, only regions of interest in the disparity maps, for example only segments which depict objects, are merged and added to the generated combined depth map. Optionally, segments which depict objects having a size below a certain threshold are filtered. Optionally, segments which depict objects in a certain shape are filtered, for example according to size and/or shape. Areas of no texture with low confidence score in the disparity calculation are filtered.

Now, as shown at 108, the single representation of distances to objects in the scene is outputted, for example a combined depth map which maps the distances to each one of the objects. As shown at 109, the process depicted in FIG. 1 may be repeated in real time, for example during the navigation of a mechanically automated vehicle in a multiple objects scene. In such a manner, an up-to-date combined depth map may be updated in real time according to images which are captured in real time.

Optionally, the process depicted in FIG. 1 is performed in real time. Optionally, the outputted combined depth map is merged with a 2D image of the scene, for example with one of the images which are captured by one of the image sensors 16, 18, 20, 22, 42, and 44. For example, distance to objects, which are depicted in the 2D image, may be added as an additional layer on top of the 2D image. Such an image forwarded to an operator of a mechanically automated vehicle which uses the imaging device 10 for navigation.

Optionally, objects in the 2D image are emphasized, for example labeled by marking their boundaries according to the aforementioned segmentation. To filter out non-interesting objects, the segmented objects are retained further accordingly to predefined criteria. The criteria may be based on the size of the objects or the environment of the scene.

Additionally or alternatively, the combined depth map is used for navigating a mechanically automated vehicle. For example, a path may be determined to a destination point visible in the 2D image. Such path is determined to lead around the objects in the displayed image that are between the imaging device 10 and the destination point. Alternatively, the destination point may be a point that is not visible in the 2D image. For example, a robot implementing the method can be instructed to return to a pre-defined base and/or arrive at a certain global positioning system (GPS) coordinate which is done based on locational information that is not captured by the imaging device 10. The mechanically automated vehicle may calculate dynamic adjustments to the path to the destination according to the information from the combined depth map.

Optionally, a user may indicate a point in the 2D image and/or in a top view of the scene that is generated according to the combined depth map, for example via a touch screen input.

It is expected that during the life of a patent maturing from this application many relevant systems and methods will be developed and the scope of the term an image sensor, a processing unit, and a mechanically automated vehicle is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of merging a plurality of disparity maps, comprising:
calculating a plurality of disparity maps each from images captured by another of a plurality of pairs of image sensors having stereoscopic fields of view (SFOVs) with at least one overlapping portion, said SFOVs covering a scene with a plurality of objects, wherein a first pair of said image sensors is arranged to cover a first of said SFOVs far from said image sensors and a second pair of said image sensors is arranged to cover a second of said SFOVs near said image sensors between said first SFOVs and said image sensors, said at least one overlapping portion of said first SFOVs and said second SFOVs is located between said image sensors and said first SFOVs;
identifying at least one of said plurality of objects in said at least one overlapping portion, said at least one object being mapped in each said disparity map;
calculating accuracy of disparity values depicting said object in each said disparity map;
merging depth data from said plurality of disparity maps according to said accuracy so as to provide a combined depth map wherein disparity values of said object are calculated according to one of said plurality of disparity maps; and
outputting said depth data.

2. The method of claim 1, further comprising using a static imaging arrangement wherein said plurality of pairs of image sensors are mounted such that a fixed distance between image sensors of one pair is different from a fixed distance between image sensors of another pair.

3. The method of claim 1, further comprising capturing a plurality of images from said plurality of stereoscopic pairs for calculating said plurality of disparity maps wherein said method is iteratively repeated for a plurality of different images from said plurality of stereoscopic pairs so as to update said depth data in real time.

4. The method of claim 1, wherein said merging comprises calculating a confidence map for each said disparity map and performing said merging according to a match between respective data from said confidence map.

5. The method of claim 1, further comprising generating instructions for navigating a mechanically automated vehicle according to said combined depth map.

6. The method of claim 1, wherein said identifying comprises segmenting said plurality of objects in each said disparity map according to a two dimensional (2D) analysis thereof.

7. The method of claim 1, wherein said identifying comprises converting each said disparity map to a three dimensional (3D) representation and segmenting said plurality of objects therein according to a 3D analysis thereof.

8. The method of claim 1, wherein said calculating comprises estimating said accuracy according to an estimated size of said object, a location in said disparity map, and a proximity of said object to a border of a segmented image.

9. The method of claim 1, wherein said calculating comprises processing segments in each said disparity map wherein at least some of said plurality of objects are identified and avoiding processing other segments in each said disparity map wherein none of said plurality of objects being identified.

10. The method of claim 1, further comprising combining said combined depth map with a two dimensional (2D) image of said scene.

11. The method of claim 1, further comprising navigating according to said depth data, a mechanically automated vehicle in said scene with said plurality of objects.

12. The method of claim 1, wherein said first SFOVs, said overlapping portion of said first SFOVs and said second SFOVs, and said second SFOVs are arranged along a line substantially perpendicular to a linear arrangement of said image sensors.

13. The method of claim 1, wherein said overlapping portion of said first SFOVs and said second SFOVs is comprised of overlapping views from at least four image sensors.

14. The method of claim 1, wherein said first pair is optically arranged to have a limited operating depth comprising said far SFOVs, and said second pair is optically arranged to have a limited operating depth comprising said near SFOVs.

15. An imaging device of generating a depth data of a scene with a plurality of objects, comprising:
- a static imaging arrangement having a plurality of pairs of image sensors are mounted to have stereoscopic fields of view (SFOVs) with at least one overlapping portion, wherein a first pair of said image sensors is arranged to cover a first of said SFOVs far from said image sensors and a second pair of said image sensors is arranged to cover a second of said SFOVs near said image sensors between said first SFOVs and said image sensors, said at least one overlapping portion of said first SFOVs and said second SFOVs is located between said image sensors and said first SFOVs;
- a processing unit which calculates a plurality of disparity maps each from images of another of said plurality of stereoscopic pairs, identifies at least one object in said at least one overlapping portion, and merges depth data from said plurality of disparity maps according to accuracy of disparity values depicting said object in each said disparity map so as to provide a combined depth map wherein disparity values of said object are calculated according to one of said plurality of disparity maps; and
- an output module which outputs said depth data.

16. The imaging device of claim 15, wherein said plurality of pairs of image sensors are mounted such that a fixed distance between image sensors of one pair is different from a fixed distance between image sensors of another pair.

17. The imaging device of claim 15, further comprising a second processing unit which calculates according to said depth data, navigation of a mechanically automated vehicle in a space containing the at least one object.

18. A computer program product, comprising a non-transitory computer usable medium having a computer readable program code embodied therein, said computer readable program code adapted to be executed to implement a method of merging a plurality of disparity maps, said method comprising:
- calculating a plurality of disparity maps each from images captured by another of a plurality of pairs of image sensors having stereoscopic fields of view (SFOVs) with at least one overlapping portion, said SFOVs covering a scene with a plurality of objects, wherein a first pair of said image sensors is arranged to cover a first of said SFOVs far from said image sensors and a second pair of said image sensors is arranged to cover a second of said SFOVs near said image sensors between said first SFOVs and said image sensors, said at least one overlapping portion of said first SFOVs and said second SFOVs is located between said image sensors and said first SFOVs;
- identifying at least one of said plurality of objects in said at least one overlapping portion, said at least one object being mapped in each said disparity map;
- calculating accuracy of disparity values depicting said object in each said disparity map;
- merging depth data from said plurality of disparity maps according to said accuracy so as to provide a combined depth map wherein disparity values of said object are calculated according to one of said plurality of disparity maps; and
- outputting said depth data.

* * * * *